United States Patent
Ward et al.

(10) Patent No.: US 9,189,885 B2
(45) Date of Patent: Nov. 17, 2015

(54) VISUAL PRESENTATION SYSTEM

(75) Inventors: Duncan Estcourt Ward, Adelaide (AU); David John Lannan, Adelaide (AU)

(73) Assignee: KNORR-BREMSE SYSTEME FUR SCHIENENFAHRZEUGE GMBH, Munich (DE)

( * ) Notice: Subject to any disclaimer, the term of this patent is extended or adjusted under 35 U.S.C. 154(b) by 717 days.

(21) Appl. No.: 13/496,044

(22) PCT Filed: Sep. 16, 2010

(86) PCT No.: PCT/AU2010/001207
§ 371 (c)(1), (2), (4) Date: Jul. 23, 2012

(87) PCT Pub. No.: WO2011/032217
PCT Pub. Date: Mar. 24, 2011

(65) Prior Publication Data
US 2012/0281002 A1    Nov. 8, 2012

(30) Foreign Application Priority Data

Sep. 16, 2009   (AU) .................................. 2009904489

(51) Int. Cl.
*G06T 15/00*    (2011.01)
*G06T 1/00*    (2006.01)
(Continued)

(52) U.S. Cl.
CPC ................. *G06T 15/30* (2013.01); *G06T 19/00* (2013.01); *H04N 13/0278* (2013.01); *G06T 17/00* (2013.01); *H04N 13/0014* (2013.01)

(58) Field of Classification Search
CPC ....... G06F 17/00–17/608; G06T 1/00–1/0092; G06T 15/00–15/005; G09G 5/00–5/008

USPC .......... 345/418, 419, 619, 629, 630, 632, 633
See application file for complete search history.

(56) References Cited

U.S. PATENT DOCUMENTS

| 4,348,186 | A | | 9/1982 | Harvey et al. |
| 6,020,893 | A | * | 2/2000 | Freeman ....................... 345/428 |

(Continued)

FOREIGN PATENT DOCUMENTS

| CN | 1873732 | A | 12/2006 |
| CN | 101065783 | A | 10/2007 |

(Continued)

OTHER PUBLICATIONS

Chinese Office Action for Patent Application No. 201080041238.9 dated May 29, 2014.

(Continued)

*Primary Examiner* — Jacinta M Crawford
(74) *Attorney, Agent, or Firm* — Barnes & Thornburg LLP

(57) ABSTRACT

A method and system for displaying a 2D representation of a 3D world on an image plane of a simulator. The image plane defines a fixed viewing region of the replica environment of the simulator and also corresponds to a view observed by an operator of the simulator. The method includes the steps of determining a head position of the operator of the replica environment and modifying a viewing volume of the 3D world based on the head position of the operator while keeping the image plane constant to form a modified viewing volume. The 2D representation based on the modified viewing volume is then generated and displayed on the image plane.

25 Claims, 7 Drawing Sheets

(51) Int. Cl.
*G06F 17/00* (2006.01)
*G06T 15/30* (2011.01)
*G06T 19/00* (2011.01)
*H04N 13/02* (2006.01)
*G06T 17/00* (2006.01)
*H04N 13/00* (2006.01)

(56) References Cited

U.S. PATENT DOCUMENTS

| | | | |
|---|---|---|---|
| 7,271,803 B2 * | 9/2007 | Ejiri | H04N 13/0278 345/427 |
| 7,675,513 B2 * | 3/2010 | Holland | H04N 13/00 345/418 |
| 2004/0017933 A1 | 1/2004 | Lestideau | |
| 2010/0110069 A1 * | 5/2010 | Yuan | 345/419 |

FOREIGN PATENT DOCUMENTS

| | | |
|---|---|---|
| CN | 100037 A | 5/2014 |
| JP | 2009-70215 A | 4/2009 |
| WO | 2005/101097 A2 | 10/2005 |

OTHER PUBLICATIONS

Notification Concerning Transmittal of International Preliminary Report on Patentability and Written Opinion of the International Search Authority for International Patent Application No. PCT/EP2010/001207, dated Sep. 16, 2010.

Szeliski et al; Creating Full View Panoramic Mosaics and Environment Maps; Proceedings of the 24th Annual Conference on Computer Graphics and Interactive Techniques; SIGGRAPH 1997; Aug. 1997; pp. 251-258.

Search Report for International Patent Application No. PCT/AU2010/001207; Nov. 26, 2010.

* cited by examiner

VISUAL PRESENTATION SYSTEM

PRIORITY CLAIM

This patent application is a U.S. National Phase of International Patent Application No. PCT/AU2010/001207, filed 16 Sep. 2010, which claims priority to Australian Provisional Patent Application No. 2009904489 entitled "VISUAL PRESENTATION SYSTEM", filed 16 Sep. 2009, the disclosures of which are incorporated herein by reference in their entirety.

FIELD

Disclosed embodiments relate to a visual presentation system. Disclosed embodiments also relate to a visual presentation system for a simulator.

BACKGROUND

The use of simulators for the training and assessment of operators of equipment ranging from aircraft to plant equipment allows these tasks to be conducted in a controlled environment where predetermined training or assessment scenarios may be employed to train or determine the competency of an operator. Clearly, the use of simulators as opposed to the actual equipment itself provides a number of benefits. The primary benefit is that the equipment remains free for use. Where an operator is being trained, the use of a simulator also allows the training to be done in an environment where the safety of the person being trained is not put at risk. This also ensures that the equipment is not at risk of being damaged. Another benefit of the use of simulators is that an operator can be trained or assessed on a scenario which in practice would be difficult to replicate in the actual operating equipment.

A simulator system will typically include a physical replica environment that replicates the operating environment of the equipment being simulated. This replica environment will often include a number of operator controls whose outputs are directly monitored by a simulation system processor which implements in real time a simulation model that models the interaction of the piece of equipment with the physical environment and also stimulates the replica environment based on the expected behavior of the equipment as it interacts with the physical environment. This stimulation may range from the simple driving of indicators such gauges and the like to the direct physical manipulation of the replica environment such as in the case of a motion platform which will move the replica environment based on the actions of the operator.

Often a critical component of a simulation system is the visual presentation system which provides a visual display to an operator located in the replica environment. As would be appreciated by those of skill in the art, the operation of most items of equipment relies heavily on the ability of an operator to view, interpret and ultimately act upon visual cues that happen in the physical world. Accordingly, for a simulator to provide an effective training or assessment tool it is necessary to reproduce what would normally be seen by the operator. The more accurate the imitation of what would be seen, the more effective the simulator will be as a training or assessment tool.

Commonly, visual presentation systems include one or more screens upon which are displayed a representation of a three dimensional (3D) world which is regenerated based on the simulated position of the equipment in the 3D world model. As an example, a train simulator which simulates the operation of a train moving on a track will display on screens positioned around the replica environment what would be viewed out of the windows of the driver's cabin (i.e. the replica environment) which is dependent on the calculated position of the driver's cabin on the track. In this manner, a front screen would represent the view of the oncoming track and side screens would represent the view seen to either side of the driver's cabin.

Typically, visual presentation systems involve the projection of an image onto a screen that is placed at a distance beyond the physical window of the replica environment. Projection of the image may be achieved with standard projection systems such as an LCD based projector combined with a suitable projection surface or the use of collimated screen type displays which function to make the image appear in the distance.

Visual presentation systems of this type suffer from a number of significant disadvantages. The main disadvantage is that the degree of simulation of parallax effects (i.e. a respective change in image with head movement) is directly dependent on the distance between the screen and the window and the size of the screen, thereby directly impacting on the size of the simulation system. Because of the size of the screen there is also an associated requirement for a high power projection system to maintain uniform brightness of the image over the projection screen. Another important disadvantage is the inability to simulate windscreen effects with any degree of realism. These include effects such as rain droplets, snow build up, dirt and mud or other windscreen artifacts such as glass tint or aberrations or damage such as cracking or chipping.

In one attempt to address these disadvantages, the image is projected directly onto the window of the replica environment. This reduces the size of the screen and hence that of the simulator and hence addresses the size related issues referred to above and also allows window effects to be simulated. However, because there is no simulation of parallax effects, simulation systems based on visual presentation systems of this type provide a poor simulation of a 3D world due to the "painted on window" effect inherent in projecting the image directly onto the window.

There is therefore a need for a visual presentation system for a simulator capable of improving the representation of a 3D world to an operator of the simulator.

SUMMARY

One disclosed embodiment provides a method for displaying a 2D representation of a 3D world on an image plane of a simulator, the image plane defining a fixed viewing region of the replica environment of the simulator and corresponding to a view observed by an operator of the simulator, the method including the steps of determining a head position of the operator of the replica environment; modifying a viewing volume of the 3D world based on the head position of the operator while keeping the image plane constant to form a modified viewing volume; generating the 2D representation based on the modified viewing volume, and displaying the 2D representation on the image plane.

A second disclosed embodiment provides a method for displaying a stereo 2D representation of a 3D world on an image plane of a simulator, the image plane defining a fixed viewing region of the replica environment of the simulator and corresponding to a view observed by an operator of the simulator, the method including the steps of determining an eye position for each eye of the operator of the replica environment; modifying a viewing volume of the 3D world for each eye based on the eye position for each eye of the operator while keeping the image plane constant to form a modified viewing volume for each eye; generating separate 2D representations based on the modified viewing volume for each, and displaying the separate 2D representations on the image plane to form a stereo 2D representation.

A third disclosed embodiment provides a visual presentation system for a simulator, the simulator including a replica environment that includes a fixed viewing region corresponding to a view observed by an operator of the simulator, the system including head position determining means for determining the head position of the operator within the replica environment; data processor means for modifying a viewing volume of the 3D world based on the head position of the operator while keeping constant an image plane of the viewing volume that corresponds to the fixed viewing region and for generating the 2D representation based on the modified viewing volume; and display means for displaying the 2D representation on the image plane.

A fourth disclosed embodiment provides a 3D visual presentation system for a simulator, the simulator including a replica environment that includes a fixed viewing region corresponding to a view observed by an operator of the simulator, the system including eye position determining means for determining the position of each eye of the operator of the replica environment; data processing means for modifying a viewing volume of the 3D world for each eye based on the eye position for each eye of the operator while keeping the image plane constant of the viewing volume that corresponds to the fixed viewing region for each eye and for generating separate 2D representations based on the modified viewing volume for each eye; display means for displaying the separate 2D representations on the image plane to form a stereo 2D representation; and viewing means for the operator to allow each eye of the operator to view the separate 2D representations.

A fifth disclosed embodiment provides a simulator including a replica environment that includes a fixed viewing region corresponding to a view observed by an operator of the simulator; head position determining means for determining the head position of the operator within the replica environment; data processor means for modifying a viewing volume of the 3D world based on the head position of the operator while keeping constant an image plane of the viewing volume that corresponds to the fixed viewing region and for generating the 2D representation based on the modified viewing volume; and display means for displaying the 2D representation on the image plane.

A sixth disclosed embodiment provides a method for displaying a 2D representation of a 3D world on a display of a training simulator, the simulator including a replica environment for providing training for an operator who also observes the display while training in the simulator, the method including the steps of determining a head position of the operator of the replica environment; regenerating the 2D representation based on the head position, and displaying the 2D representation on the display.

A seventh disclosed embodiment provides a training simulator for an operator including a replica environment; head position determining means for determining a head position of the operator within the replica environment; display means for displaying a 2D representation of a 3D world that the replica environment operates in; and data processor means for regenerating the 2D representation to be displayed on the display means based on the head position of the operator.

BRIEF DESCRIPTION OF THE DRAWINGS

Disclosed embodiments will be discussed with reference to the accompanying drawings wherein.

In the following description, like reference characters designate like or corresponding parts throughout the several views of the drawings.

DETAILED DESCRIPTION

Figure 1:
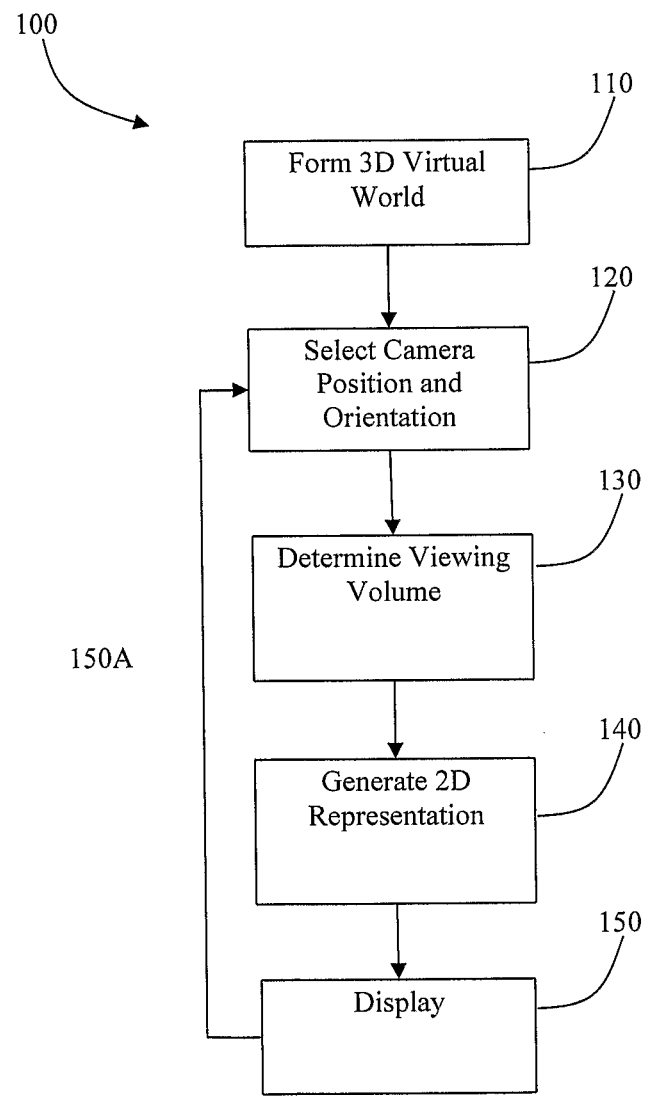
FIG. 1 is a flow chart diagram depicting the steps involved in the computer generated display of a 3D world on a display in accordance with one exemplary prior art method.

One disclosed embodiment provides a method for displaying a 2D representation of a 3D world on an image plane of a simulator, the image plane defining a fixed viewing region of the replica environment of the simulator and corresponding to a view observed by an operator of the simulator, the method including the steps of determining a head position of the operator of the replica environment; modifying a viewing volume of the 3D world based on the head position of the operator while keeping the image plane constant to form a modified viewing volume; generating the 2D representation based on the modified viewing volume, and displaying the 2D representation on the image plane.

In another disclosed embodiment, the viewing volume is modified to take into account the different perspective of the operator with respect to the fixed viewing region. In yet another disclosed embodiment, the head position of the operator is determined by a face tracking system. In a further disclosed embodiment, the fixed viewing region corresponds to a window of the replica environment. In another disclosed embodiment, the fixed viewing region corresponds to a mirror of the replica environment. In yet another disclosed embodiment, the 2D representation is directly displayed on the image plane. In a further disclosed embodiment, the 2D representation is projected onto the image plane. In another disclosed embodiment, the steps of determining head position, modifying the viewing volume and generating and displaying the 2D representation are implemented in real time. In yet another disclosed embodiment, the method further includes applying windscreen effects to the 2D representation displayed on the image plane. In a further disclosed embodiment, head orientation is also determined. In another disclosed embodiment, predetermined changes in head orientation are processed to provide simulator control commands for the simulator. In yet another disclosed embodiment, the simulator is a training simulator for training the operator.

A second disclosed embodiment provides a method for displaying a stereo 2D representation of a 3D world on an image plane of a simulator, the image plane defining a fixed viewing region of the replica environment of the simulator and corresponding to a view observed by an operator of the simulator, the method including the steps of determining an eye position for each eye of the operator of the replica environment; modifying a viewing volume of the 3D world for each eye based on the eye position for each eye of the operator while keeping the image plane constant to form a modified viewing volume for each eye; generating separate 2D representations based on the modified viewing volume for each, and displaying the separate 2D representations on the image plane to form a stereo 2D representation.

In another disclosed embodiment, the eye position for each eye is determined by determining a head position and a separation of the eyes of the operator.

A third disclosed embodiment provides a visual presentation system for a simulator, the simulator including a replica environment that includes a fixed viewing region corresponding to a view observed by an operator of the simulator, the system including head position determining means for determining the head position of the operator within the replica environment; data processor means for modifying a viewing volume of the 3D world based on the head position of the operator while keeping constant an image plane of the viewing volume that corresponds to the fixed viewing region and for generating the 2D representation based on the modified viewing volume; and display means for displaying the 2D representation on the image plane.

In another disclosed embodiment, the head position determining means includes a face tracking system. In yet another disclosed embodiment, the head position determining means includes a sensor for detecting one or more corresponding signal emitters located on the head of the operator. In a further disclosed embodiment, the fixed viewing region corresponds to a window of the replica environment. In another disclosed embodiment, the fixed viewing region corresponds to a mirror of the replica environment. In yet another disclosed embodiment, the display means directly displays the 2D representation on the image plane. In a further disclosed embodiment, the display means projects the 2D representation onto the image plane. In another disclosed embodiment, the display means is updated in real time based on the head position of the operator. In yet another disclosed embodiment, the data processor further includes in the generation of the 2D representation the application of windscreen effects to the 2D representation displayed on the image plane. In a further disclosed embodiment, the visual presentation system further includes head orientation determining means.

A fourth disclosed embodiment provides a 3D visual presentation system for a simulator, the simulator including a replica environment that includes a fixed viewing region corresponding to a view observed by an operator of the simulator, the system including eye position determining means for determining the position of each eye of the operator of the replica environment; data processing means for modifying a viewing volume of the 3D world for each eye based on the eye position for each eye of the operator while keeping the image plane constant of the viewing volume that corresponds to the fixed viewing region for each eye and for generating separate 2D representations based on the modified viewing volume for each eye; display means for displaying the separate 2D representations on the image plane to form a stereo 2D representation; and viewing means for the operator to allow each eye of the operator to view the separate 2D representations.

A fifth disclosed embodiment provides a simulator including a replica environment that includes a fixed viewing region corresponding to a view observed by an operator of the simulator; head position determining means for determining the head position of the operator within the replica environment; data processor means for modifying a viewing volume of the 3D world based on the head position of the operator while keeping constant an image plane of the viewing volume that corresponds to the fixed viewing region and for generating the 2D representation based on the modified viewing volume; and display means for displaying the 2D representation on the image plane.

A sixth disclosed embodiment provides a method for displaying a 2D representation of a 3D world on a display of a training simulator, the simulator including a replica environment for providing training for an operator who also observes the display while training in the simulator, the method including the steps of determining a head position of the operator of the replica environment; regenerating the 2D representation based on the head position, and displaying the 2D representation on the display.

A seventh disclosed embodiment provides a training simulator for an operator including a replica environment; head position determining means for determining a head position of the operator within the replica environment; display means for displaying a 2D representation of a 3D world that the replica environment operates in; and data processor means for regenerating the 2D representation to be displayed on the display means based on the head position of the operator.

Referring now to FIG. 1, there is shown a flowchart diagram of one disclosed method 100 for the computer generated display of a 2D representation of a 3D world.

In first step 110, a 3D world is formed by placing a series of individual 3D objects within a virtual space. Typically, 3D objects are created using specialized software tools which allow an operator to build a model of an object out of component surfaces. Some example software tools for generating 3D objects include, but are not limited to, Autodesk™ 3ds Max™ or Maya™ and Google™ SketchUp™. These component surfaces may be based on standard geometrical shapes or be manipulable surfaces based on a spline representation which may be customized to match the shape of an irregular surface.

Another example of a mathematical description employed in the forming and subsequent representation of 3D models is a wireframe model which in its simplest form is a data-structure that records vertex information corresponding to vertices on the object being modeled and associated edge information which spans individual pairs of vertices. These edges may be formed from straight lines or curves depending on the object being modeled.

In the example of a simulator, the various 3D objects that are created for a 3D world correspond to physical objects that the simulated apparatus is likely to encounter. Taking a train simulator as one illustrative example, these objects would include items such as train tracks; environmental aspects such as trees and terrain variation; trackside furniture such as signaling apparatus; and relevant buildings such as stations and the like. Where a 3D world is formed to reproduce an actual location, individual 3D objects corresponding to actual items in the location are placed in the same spatial relationship with respect to each other as they are in the physical location.

3D objects may also include dynamic properties which govern their movement and evolution during a simulation time period that occurs in the 3D world. Some example of 3D objects that include dynamic properties include, but are not limited to, environmental objects such as clouds, waves and trees; physical objects such as vehicles and the like; and simulated humans whose motion may be governed by reaction to the movement of other objects with the 3D world and which may further involve a random component determining their movement.

Associated with each surface of a 3D object are the surface visual properties which affect the appearance of these individual surfaces. These visual properties include, but are not limited to surface texture and reflectivity. As would be appreciated by those skilled in the art, the forming of a 3D world is generally a time consuming process as it requires the definition of the 3D geometrical, visual and potentially dynamic characteristics of an object so that it may be viewed from any direction. In some examples, a 3D world may include 2D components for those regions within the 3D world that are not traversed and which in practice would only be viewed from a distance.

At step 120, the camera position Po and orientation within the 3D world that corresponds to the view position is selected. In the example of a simulator, the camera position corresponds to the initial position Po and orientation of an operator within the 3D world in which the simulator operates. In this case the initial position would correspond to the assumed "local" position of the operator of the simulator within the replica environment in combination with the "global" position of the replica environment within the 3D world. Similarly, the operator will have an assumed "local" orientation with respect to orientation within the replica environment which is combined with the "global" orientation of the replica environment within the 3D world.

For a train simulator where the image corresponds to what is displayed on a front window, the assumed local position of the operator would be the normal driving position of the operator within the replica cabin environment and the local orientation would be straight ahead through the front window corresponding to the normal direction of gaze when driving. Where the image corresponds to what is displayed out of a side window the assumed local orientation would then correspond to the operator looking to that side within the replica cabin environment. The global position and orientation will then correspond to the location of the replica environment within the 3D world e.g. three kilometers along the track between station A and B with the train facing west in this location.

Figure 2:
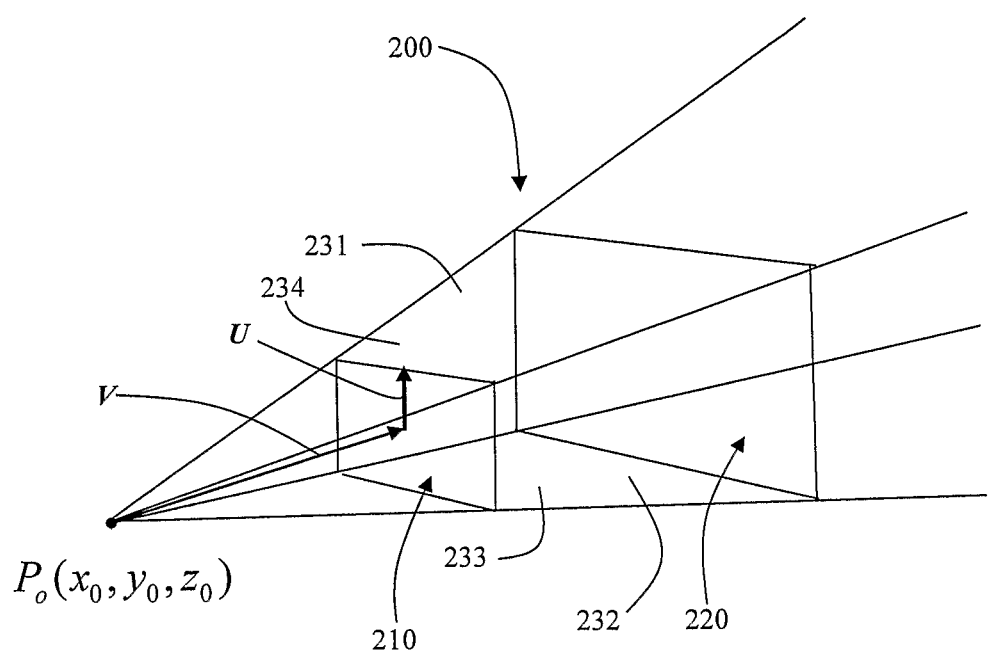
FIG. 2 is a schematic diagram showing the viewing volume associated with the computer generated display of a 3D world as illustrated in FIG. 1.

At step 130 the associated viewing volume is determined for the camera position and orientation selected at step 120. Referring now to FIG. 2, there is shown a representation of an example viewing volume 200 corresponding to camera position Po oriented as indicated. The viewing volume 200 defines the portion of the 3D world that forms part of the 2D representation that is generated at the image or near plane 210.

For the case of a rectangular image plane 210 the viewing volume is the frustum of a rectangular pyramid and in this case the viewing volume 200 is generally referred to in the art as the view frustum. While in this disclosed embodiment, the image plane 210 is both rectangular and planar it would be appreciated that the image plane 210 may have any regular or non-regular boundary or outline and further be non-planar and incorporate variations in curvature. Objects that are closer to Po then image plane 210 are not generated in the 2D representation. Similarly, objects that are located beyond the far plane 220 or outside the side walls of clipping planes 231, 232, 233, 234 of viewing volume 200 do not form part of the 2D representation being generated.

In many circumstances, the far plane 220 is placed at infinity so that all objects located from the image plane 210 and within viewing volume 200 are represented. As referred to previously, any objects that do not fall within viewing volume 200 are not represented. As such, the determination of the viewing volume 200 not only defines the location of the image plane with respect to Po and a given orientation it also functions to define those objects that may be culled from the full 3D model when generating the 2D representation corresponding to the image plane 210, thereby increasing the computational efficiency of this process.

The viewing volume 200, which in this disclosed embodiment relates to a rectangular planar image plane 210, may be defined by the location $P_o$ ($x_o$, $Y_o$, $z_o$) which forms the apex of viewing volume 200 and a view vector V which defines the direction of view from $P_o$ to the center of the near plane 210 of the viewing volume 200. The tilt of the viewing volume 200 is further defined by a vector U which lies on the image plane 210 and is perpendicular to view vector V. The position of the near plane 210 can then be defined by a distance extended along view vector V from $P_o$ ($x_0$, $Y_0$, $z_0$).

The boundary of the near plane 210 can then be defined by parameters which define the vertical extent (in the direction U) and horizontal extent (in the direction perpendicular to U) of the near plane 210 from the intersection of V and the image plane 210. Similarly, the far plane 220 can be defined as a distance along V from the near plane 210 or in terms of a geometrical multiplication factor times the near plane 210. As would be apparent to those of skill in the art, the definition of viewing volume 200 may be defined in many different ways. In another non-limiting example the location of Po and the vertices of both the near plane 210 and far plane 220 are specified in terms of vertical and horizontal angles from V fully define the viewing volume 200.

Taking once again the example of a train simulator and an operator looking out of the front cabin window, the camera position Pp is assumed to be the typical location of the train driver when driving and the orientation or view vector V is assumed to be straight ahead through the middle of the window. Where the cabin window is the display, the image plane 210 corresponds to the location of the cabin window with respect to Po. In those circumstances where an image is displayed on a screen that is located in front of the window then image plane 210 will correspond to that location of the screen.

Referring once again to FIG. 1, at step 140 a 2D representation is then generated based on the viewing volume 200. This process corresponds to generating a series of pixel values at the image plane 210 that correspond to the 3D world. As would be appreciated by those of skill in the art there are many techniques to achieve this outcome. In one example, a 3D to 2D perspective projection is first carried out on the objects within the viewing volume 200 to define the corresponding 2D base geometric data of the objects as viewed on the image plane 210.

Following this process, the 2D base geometric data is broken into polygons and rendered. The rendering process takes into account the lighting properties of the 3D world which may be separately defined and the interaction of these lighting effects with the surface characteristics of the objects being represented resulting in shading and reflectance effects that correspond to the object being represented. Depending on the sophistication of the rendering process other optical artifacts such as depth of field may also be incorporated to reflect 3D effects that would typically be encountered by viewing the equivalent scene in 3D.

Specialized graphics libraries are employed to carry out the various steps of method 100. These include, but are not limited to, Direct3D™ from Microsoft for Windows™ based operating systems and OpenGL™. A number of these rendering options are implemented in hardware such as graphic cards incorporating specialized graphics processing units (GPU) which are optimized to perform the computationally intensive rendering operations.

At step 150 the 2D representation consisting of a series of pixel corresponding to the image plane 210 is displayed. In the example of a single rendered scene the process is complete. More commonly a time series of 2D representations are generated that correspond to movement throughout the 3D world requiring iteration 150A of this process. In the example of a computer animated movie, the selection of the next camera position and orientation is deterministic based on predetermined viewpoints which may be associated with characters within the movie and the like. In the example of a simulator or a game, the camera position and orientation within the 3D world is determined based on the actions of an operator of the simulator or player of the game. For example, in a train simulator, the position P, will depend on the position of the calculated position of the locomotive which will primarily depend on how fast the train is moving and the orientation will depend on the orientation of the track.

One example publication describing many aspects of the methods employed to generate 2D representations of a 3D world is Real-Time Rendering (Tomas Akenine-Moller, Eric Haines, and Naty Hoffman, A. K. Peters Ltd., 3rd edition, 2008) whose disclosure is hereby incorporated by reference in its entirety.

Figure 3:
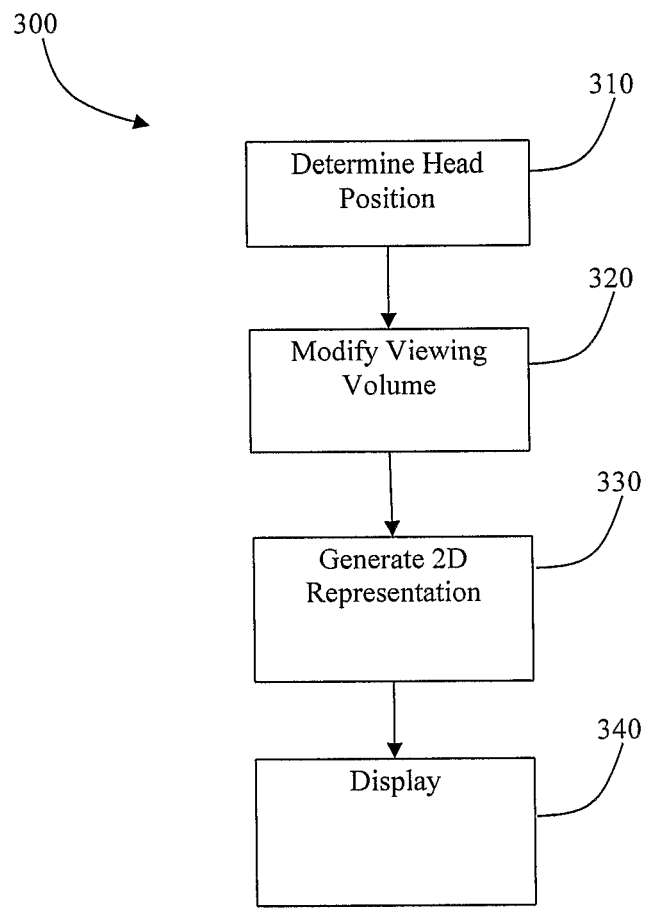
FIG. 3 is a flow chart diagram of a method for displaying a 2D representation of a 3D world on an image plane for a simulator in accordance with one disclosed embodiment.

Referring now to FIG. 3, there is shown a method 300 for displaying a 2D representation of a 3D world on an image plane for a simulator according to one disclosed embodiment. In this disclosed embodiment, the image plane 210 defines a fixed viewing region within the replica environment of the simulator. In one disclosed embodiment, this fixed viewing region could be a front window of the replica environment and as a consequence the image plane is limited by the border of the front window. In other disclosed embodiments, the fixed viewing region may be other windows located in the replica environment which will similarly define a fixed border for the image plane.

Another example of a fixed viewing region may correspond to the view provided by a mirror such as commonly encountered on vehicles. Examples include, but are not limited to, a side mirror located externally to the replica environment or a rear view mirror located inside the vehicle. In these cases the image plane 210 corresponds to the expected reflected or mirror view of 3D world as observed by an operator.

At step 310 the head position of an operator of the simulator is determined within the replica environment. In one disclosed embodiment, the head position is determined from a sensor or camera which measures the movement of one or more corresponding signal emitters located on the head of the operator such as infra-red (IR) reflectors that reflect IR light emitted from an IR source generally co-located with the camera and pointed towards the operator. The IR reflectors are mounted on a frame which is worn by the operator of the simulator in a similar manner to glasses, thereby providing spatial information about the head position within the camera's field of view.

An example system of this type is the Track IR™ system from NaturalPoint™. In another disclosed embodiment, the head position is determined by facial recognition software based on images taken by a standard video or web camera. One example of face recognition software that is suitable for this task is the faceAPI™ face tracking system from Seeing-Machines™ which provides position information of the operator's head without the requirement of the operator having to wear any head mounted apparatus.

In another disclosed embodiment, the head position is determined by head mounted gyroscopic and accelerometer devices which are able to determine variations in position of the head. In another disclosed embodiment, signal emitters in the form of radio frequency (RF) tags could be worn by the operator and the head position inferred by a number of sensors in the form of RF receivers and triangulation of the received signals. In yet another disclosed embodiment, the head position may be determined by employing multiple views of the operator taken by multiple cameras to track the movement of the head of the operator and to calculate its 3D location.

In a further disclosed embodiment, the head position may be inferred by pressure or weight sensors located in the seat that the operator is seated upon. As an example, where the operator leans forward, a sensor will sense the extra pressure at the front portion of the seat and based on this increased pressure then calculate that the head position has moved forward from the default position based on the body geometry of the operator. Similarly, when the operator leans to either side or backwards the head position of the operator will be redetermined. In one disclosed embodiment, the body geometry of the operator may be assumed based on expected body size and shape. In another disclosed embodiment, the simulator will prompt the operator to enter details such as height prior to commencing the simulation.

Figure 4:
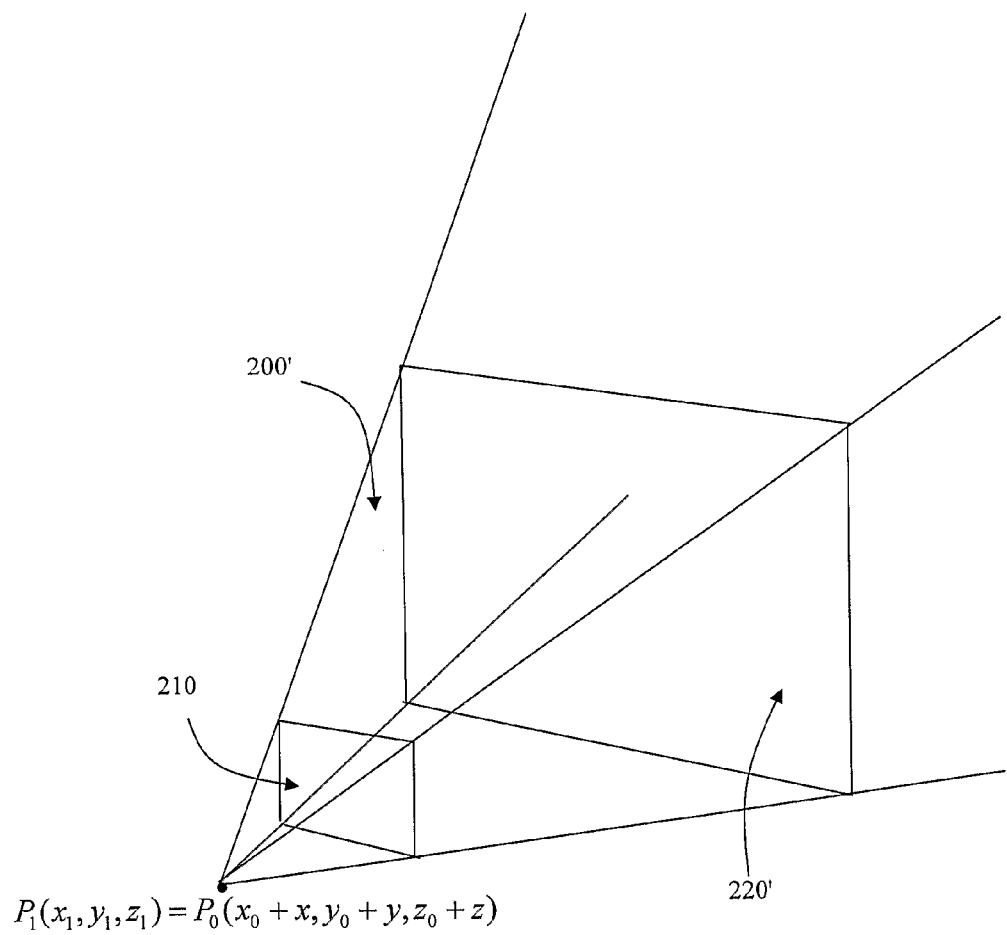
FIG. 4 is a schematic diagram showing the viewing volume as modified based on the head position of an operator in accordance with the method for displaying a 2D representation illustrated in FIG. 3.

At step 320 the viewing volume 200 is modified based on the determined head position and as the image plane 210 corresponds to the front window of the simulator the image plane 210 is kept constant as it corresponds to a fixed viewing region within the replica environment. Referring now to FIG. 4, there is shown the modified viewing volume 200' corresponding to the new head position P1 of the operator who has changed their location within the replica environment.

Figure 5:
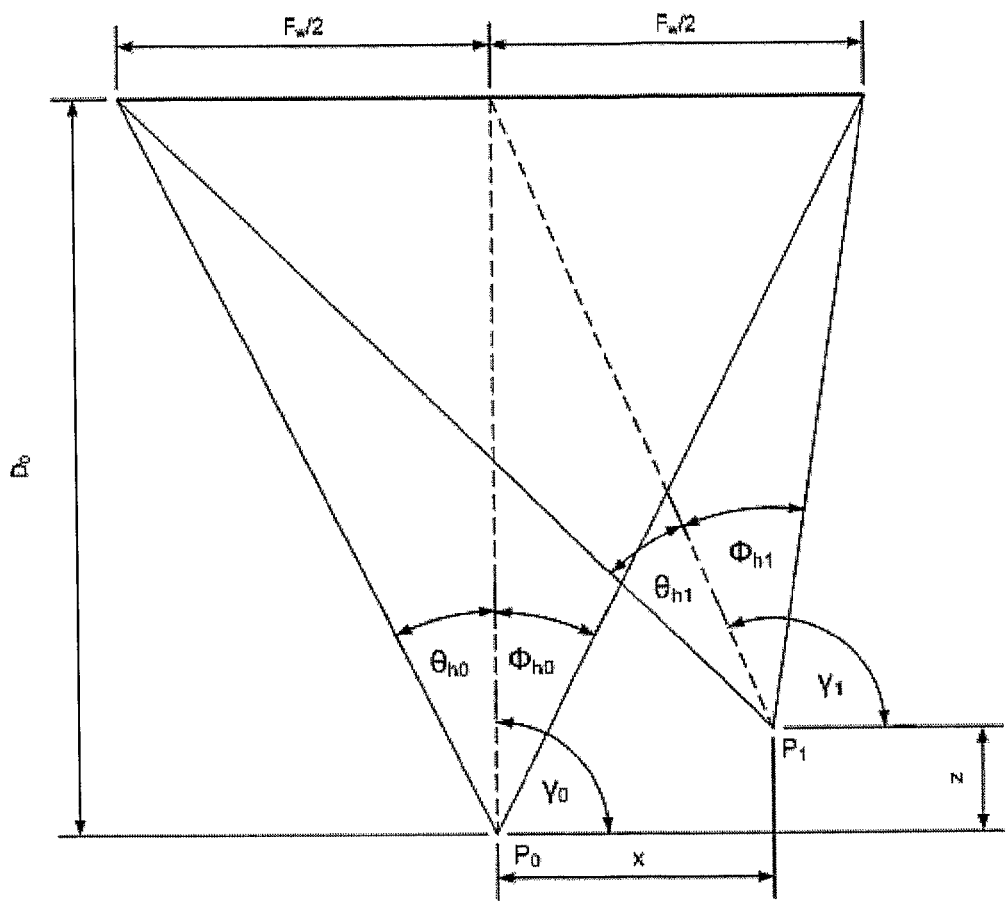
FIG. 5 is a horizontal view of the region between the operator and the image plane indicating the change in head position of the operator with respect to the image plane.
Figure 6:
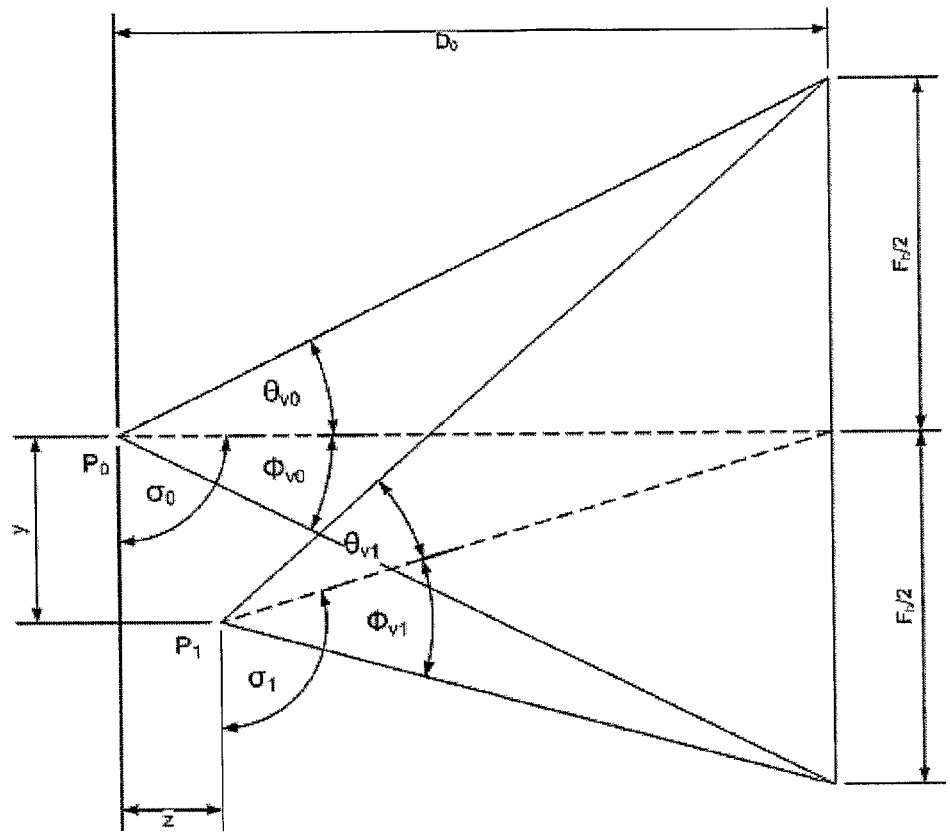
FIG. 6 is a vertical view of the region between the operator and the image plane similar to that depicted in FIG. 5 also indicating the change in head position of the operator with respect to the image plane.

Referring now to FIGS. 5 and 6, there are shown horizontal and vertical depictions of the image plane 210 and associated modified viewing volume 200' associated with the change in head position as determined at step 310. Taking as an example where image plane 210 corresponds to a view through the front window of the simulator then the initial image plane 210 is centered about the position Po of the operator. The dimensions of image plane 210 are matched to the physical display device that is used to simulate the window which as described previously may be a display screen such as an LCD screen or a projection screen upon which the 2D representation is projected or a combination of these display methodologies.

As an example, for a LCD screen having the dimensions of the front window the dimensions of the image plane 210 in the 3D world, $F_w$ and $F_h$ are set to match the width and height dimensions of the LCD screen respectively. Similarly the initial distance for the operator $D_o$ is set to the distance away from the monitor that the observer is positioned for normal viewing.

In this disclosed embodiment, the image plane 210 and position of the operator Po for initial viewing volume 200 are defined by the following parameters:

horizontal field of view angles, $\theta_{ho}, \varnothing_{ho}$ which in the initial position extend symmetrically to the left and right of a line extending from $P_0$, to the horizontal midpoint of the image plane 210 (as best seen in FIG. 5);

vertical field of view angles, $\theta_{vo}, \varnothing_{vo}$ which in the initial position extend symmetrically above and below of a line extending from $P_o$ to the vertical midpoint of the image plane 210 (as best seen in FIG. 6);

horizontal view angle $\gamma_0$ where $\gamma_0 = \pi$ for initial position $P_o$; and vertical view angle $\sigma_0$ where $\sigma_0 = \pi$ for initial position $P_o$.

Horizontal field angles are calculated by the following relationship:

$$\theta_{h0} = \phi_{h0} = \tan^{-1}\frac{F_w}{2D_0}$$

Similarly vertical field angles are calculated by:

$$\theta_{v0} = \phi_{v0} = \tan^{-1}\frac{F_h}{2D_0}$$

When the operator moves their head to new location $P_1$ ($x_1$, $y_1$, $z_1$)=$P_0$ ($x_0$+x, $y_0$+y, $z_0$+z) that is offset from the initial position by x, y, z a new asymmetric viewing volume 200' having the image plane 210 is determined for the 2D representation that is to be generated.

As can be seen by inspection of FIGS. 5 and 6, the new viewing volume 200' can be defined for $P_1$ where $P_1$ ($x_1$, $y_1$, $z_1$)=$P_o$ ($x_o$+x, $y_o$+y, $z_o$+z) by new horizontal field of view angles $\theta_{h1}, \emptyset_{h1}$, where:

$$\theta_{h1} = \tan^{-1}\frac{D_0 - z}{x} - \tan^{-1}\frac{2(D_0 - z)}{F_w}$$

$$\phi_{h1} = \pi - \tan^{-1}\frac{D_0 - z}{x} - \tan^{-1}\frac{D_0 - z}{\left(\frac{F_w}{2} - x\right)}$$

and the new vertical field of view angles, $\theta_{v1}, \emptyset_{v1}$ corresponding to $P_1$ are defined by:

$$\theta_{v1} = \tan^{-1}\frac{D_0 - z}{y} - \tan^{-1}\frac{2(D_0 - z)}{F_h}$$

$$\phi_{v1} = \pi - \tan^{-1}\frac{D_0 - z}{y} - \tan^{-1}\frac{D_0 - z}{\left(\frac{F_h}{2} - y\right)}$$

with the new horizontal view angle $\gamma_1$ and vertical view angle $\sigma_0$ defined by:

$$\gamma_1 = \pi - \tan^{-1}\frac{D_0 - z}{x}$$

$$\sigma_1 = \pi - \tan^{-1}\frac{D_0 - z}{y}$$

Following modification of viewing volume at step 320 a new 2D representation is generated at step 330 based on the modified asymmetric viewing volume 200' as described previously which is then displayed at step 340.

As has been found, where there is a fixed viewing region such as a window it is only necessary to determine the position of the head within the simulator environment in order to generate the correct perspective view. As would be appreciated by those skilled in the art, the necessary computations required to modify the viewing zone are correspondingly more efficient which reduces the computational power required to carry out these calculations. Accordingly, disclosed embodiments may be implemented in what otherwise would be considered relatively low level data processor equipment in the simulator art such as a standard PC configured for gaining as opposed to requiring expensive high end computational equipment.

In other disclosed embodiments, the head orientation may also be determined and this information could be used to provide simulator control commands so that in one disclosed embodiment a person making a distinctive nod movement could commence the simulation and then pause the simulation by another predetermined change in head orientation. As an example, the faceAPI™ face tracking system from SeeingMachines™ is able to determine the head orientation in addition to head position.

Figure 7:
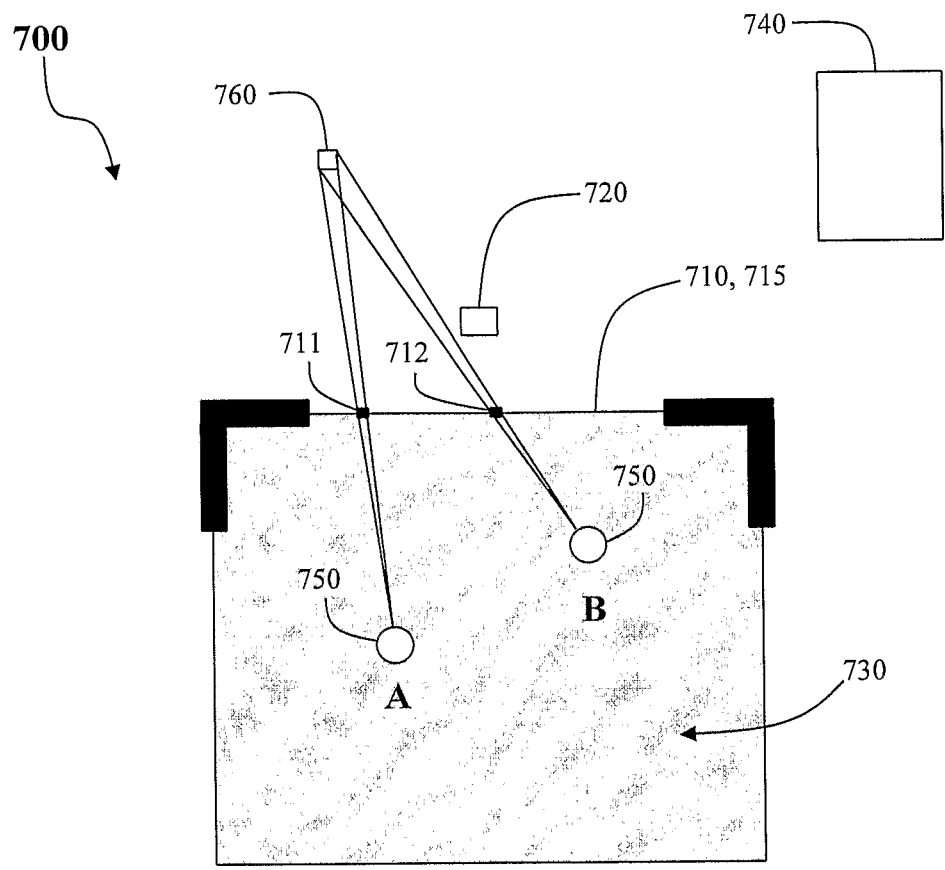
FIG. 7 is a system view representation of a visual presentation system for a simulator in accordance with another disclosed embodiment.

Referring now to FIG. 7, there is shown a visual presentation system 700 for a simulator according to another disclosed embodiment. In this disclosed embodiment, the visual presentation system 700 is described in relation to its use with a train simulator typically used to instruct an operator such as a train driver in the driving and handling of a locomotive. However, as would be appreciated by those of skill in the art, the disclosed embodiments will be generally applicable to where an operator of a simulator is viewing a 2D representation of a 3D world through a fixed viewing region. Accordingly, the replica environment 730 of the simulator replicates a driver's cabin incorporating the suitable controls and indicators of the locomotive being simulated (not shown) and a fixed viewing region that corresponds to the front window 710 of the replica environment 730.

Visual presentation system 100 includes a camera 720 that is positioned to view the operator of the simulator's head. In this disclosed embodiment, camera 720 and associated faceAPI™ image processing software functions to determine the head position of the operator by capturing in real time an image of the head and then determining by optical face recognition the head position as the operator moves within replica environment 730.

In this disclosed embodiment directed to a train simulator the required update rate of the camera 720 is approximately 10 Hz due to the expected speed of head movement of the operator. Accordingly, and as described previously, camera 720 may be based on a standard web camera arrangement. In other types of simulators such as flight simulators where more rapid head movement is expected, the update rate may be increased as required and this may require more specialized cameras capable of update rates of up to 60 Hz.

Visual presentation system 700 further includes vision system processor 740 which carries out the image processing calculations for modifying the viewing volume of the 3D world based on the head position of the operator as determined by camera 720 while keeping constant the image plane of the viewing volume that corresponds to the fixed viewing region 710 in accordance with the method as described in one disclosed embodiment with respect to FIGS. 3 to 6. In this disclosed embodiment the fixed viewing region and image plane correspond to the front window of the driver's cabin. Vision system processor 740 further functions to generate the 2D representation based on the modified viewing volume.

In this disclosed embodiment, vision system processor 740 is a standard desktop personal computer (PC) based on an Intel™ central processing unit (CPU) having a clock speed over 2 GHz incorporating a Nvidia™ GeForce™ graphics card but equally this functionality may be distributed over a number of separate computers or processors depending on the requirements of the system and the degree of fidelity required of the 3D world.

In this disclosed embodiment, the 2D representation is then displayed on LCD screen 715 which effectively substitutes for the front window of the driver's cabin. In other disclosed embodiments, the 2D representation is projected onto a screen corresponding to the location of the front window or more generally the fixed viewing region.

In accordance with one disclosed embodiment, based on the head position determined by camera 720, visual presentation system 700 is able regenerate the 2D representation of the 3D world to take into account the altered location of the operator of the simulator and their viewing direction. As shown in FIG. 7, operator 750 at position A viewing object 760 will see a representation of this object on the screen at location 711 having a first perspective. The operator 750 at position B will view the same object 760, but from this head location and viewing angle the object 760 will appear to be at 712 having a second different perspective.

As would be appreciated by those of skill in the art, visual presentation methods and systems provide a number of significant benefits over prior art systems by simulating the parallax effects that would be expected when an operator moves within the replica environment and views the outside world through a fixed viewing region such as a window. By displaying the image on an image plane corresponding to the fixed viewing region the size of the simulator may be kept to a minimum while still improving the representation of a 3D world to an operator of the simulator. This reduction in size reduces operating costs and improves portability in the case of mobile simulators where the disclosed embodiments may be applied. Furthermore, windscreen effects can be effectively implemented without compromising on the representation of the 3D world to an operator of the simulator.

Another disclosed embodiment provides a method for displaying a stereo 2D representation of a 3D world on an image plane for a simulator. In this disclosed embodiment, a different 2D representation is displayed on the image plane corresponds to the position of each eye of the operator so that each eye views a different perspective. In one example, the position of each eye is determined by determining the separation of the eyes and then forming respective or separate 2D representations for each eye by offsetting the "monocular" 2D representation that would be created for the head position as has been described previously. In this manner, each of the 2D representations that combine to form the stereo 2D representation is constructed in the same manner as the standard 2D representation except each image is based on a determined position of the respective eye as opposed to determined position of the head. Similarly, as with the case of generating the monocular 2D representation, eye orientation information may also be employed where it is available.

To display a stereo 2D representation based on separate 2D representations generated for each eye there are a number of known techniques also involve viewing means for the operator that allow each eye of the operator to view the separate 2D representation which include, but are not limited to:

passive display techniques which involve coding each 2D representation corresponding to each eye by polarizing or colorizing wherein the operator wears glasses to differentially filter out the correct 2D representation for each eye;

active display techniques which involve alternatively displaying each 2D representation corresponding to each eye and the operator wearing shutter glasses to mask out the unwanted 2D representation in synchronization with the display;

prismatic display techniques which involve prisms to differentiate the 2D representations seen by each eye;

parallax barrier techniques which involve a grid structure to differentiate the 2D representations seen by each eye; and lenticular lens techniques which involve a grid structure of lenticular lenses to differentiate the 2D representations seen by each eye.

As would be appreciated by those of ordinary skill in the art, the disclosed embodiments may be employed to also augment a simulator involving a motion platform. These types of simulators typically involve either the display or displays being mounted with the replica environment on the motion platform or alternatively the display is static with respect to the motion platform.

For simulators with static vision displays, the displayed 2D representation of the 3D world is adapted to move with sustained acceleration simulation movements of the motion base i.e. where the motion system uses pitch or a roll to simulate longitudinal or lateral acceleration such as in the case of braking or acceleration. In this case the vision seen from the operator's position in the replica environment located on the motion platform or base should not observe this relative movement and the displayed 2D representation is compensated accordingly as the replica environment is in fact moving with respect to the static display. Where there are motions that do not involve sustained accelerations such as suspension movements (e.g. a vehicle going over a bump in the road) the vision remains static with the operator's perception of the motion then being generated by the relative movement between the motion platform and display.

For simulators where the display means is mounted on the motion platform the opposite visual processing is required. In this case, sustained accelerations should not change the displayed vision which will be the case as the display is mounted to the motion base but suspension movements should. Accordingly, during suspension movements the vision must be compensated to provide the effect of relative movement between the replica environment and the displayed 2D representation of the 3D world.

In each of these cases, the visual processing required to compensate for a motion platform amounts to determining a revised camera position and orientation within the 3D world. The disclosed system and method may then be employed to compensate for the modified viewing volume that arises due to changes in the head position of the operator within the replica environment.

While a number of embodiments have been disclosed with reference to a train simulator, it would be appreciated by those of skill in the art that other types of simulators are contemplated to be within the scope of the present invention. These include, but are not limited to, vehicle simulators such as those simulating the operation of planes, trains, trucks, buses, automobiles, tanks, naval vessels, space vehicles, underwater vessels; material handling equipment simulators such as those simulating the operation of forklifts, backhoes, loaders, trenchers, graders and bobcats; mining simulators simulating vehicles and equipment for both surface and underground mining such as haul trucks, underground loaders, underground trucks, wheel loaders, hydraulic shovels and excavators, electric rope shovels, track dozers and draglines; and heavy equipment simulators such as those simulating the operation of cranes, heavy loading equipment, dump trucks and bucket wheel reclaimers. While simulators are generally used for training purposes, equally it will be understood that the term simulator can include within its scope devices that are constructed for amusement rides and the like, design and research into new types of equipment and marketing and advertising purposes.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The reference to any prior art in this specification is not, and should not be taken as, an acknowledgement of any form of suggestion that such prior art forms part of the common general knowledge.

It will be understood that the invention is not limited to the embodiments disclosed, but is capable of numerous rearrangements, modifications and substitutions without departing from the scope of the invention as set forth and defined by the claims.

The invention claimed is:

1. A method for displaying a 2D representation of a 3D world on an image plane of a simulator, the image plane defining a fixed viewing region of a replica environment of the simulator and corresponding to a view observed by an operator of the simulator, the method comprising:
    determining a head position of the operator of the replica environment;
    modifying a viewing volume of the 3D world based on the head position of the operator while keeping the image plane constant to form a modified viewing volume such that the viewing volume of the 3D world is modified for each eye based on the eye position for each eye of the operator while keeping the image plane constant to form a modified viewing volume for each eye;
    generating the 2D representation based on the modified viewing volume such that the modified viewing volume is provided for each eye of the operator; and
    displaying the 2D representation on the image plane.

2. The method for displaying a 2D representation of a 3D world of claim 1, wherein the viewing volume is modified to take into account the different perspective of the operator with respect to the fixed viewing region.

3. The method for displaying a 2D representation of a 3D world of claim 1, wherein the head position of the operator is determined by a face tracking system.

4. The method for displaying a 2D representation of a 3D world of claim 1, wherein the fixed viewing region corresponds to a window of the replica environment.

5. The method for displaying a 2D representation of a 3D world of claim 1, wherein the fixed viewing region corresponds to a mirror of the replica environment.

6. The method for displaying a 2D representation of a 3D world of claim 1, wherein the 2D representation is directly displayed on the image plane.

7. The method for displaying a 2D representation of a 3D world of claim 1, wherein the 2D representation is projected onto the image plane.

8. The method for displaying a 2D representation of a 3D world of claim 1, wherein the determining head position, modifying the viewing volume and generating and displaying the 2D representation are implemented in real time.

9. The method for displaying a 2D representation of a 3D world of claim 1, further comprising applying windscreen effects to the 2D representation displayed on the image plane.

10. The method for displaying a 2D representation of a 3D world of claim 1, wherein head orientation is also determined.

11. The method for displaying a 2D representation of a 3D world of claim 10, wherein predetermined changes in head orientation are processed to provide simulator control commands for the simulator.

12. The method for displaying a 2D representation of a 3D world of claim 1, wherein the simulator is a training simulator for training the operator.

13. A method for displaying a stereo 2D representation of a 3D world on an image plane of a simulator, the image plane defining a fixed viewing region of a replica environment of the simulator and corresponding to a view observed by an operator of the simulator, the method comprising:
    determining an eye position for each eye of the operator of the replica environment;
    modifying a viewing volume of the 3D world for each eye based on the eye position for each eye of the operator while keeping the image plane constant to form a modified viewing volume for each eye;
    generating separate 2D representations based on the modified viewing volume for each eye; and
    displaying the separate 2D representations on the image plane to form a stereo 2D representation.

14. The method for displaying a stereo 2D representation of a 3D world of claim 13, wherein the eye position for each eye is determined by determining a head position and a separation of the eyes of the operator.

15. A visual presentation system for a simulator, the simulator including a replica environment that includes a fixed viewing region corresponding to a view observed by an operator of the simulator, the system comprising:
    head position determining means for determining the head position of the operator within the replica environment;
    data processor means for modifying a viewing volume of a 3D world based on the head position of the operator while keeping constant an image plane of the viewing volume that corresponds to the fixed viewing region and for generating a 2D representation based on the modified viewing volume such that the viewing volume of the 3D world is modified for each eye based on the eye position for each eye of the operator while keeping the image plane constant to form a modified viewing volume for each eye; and
    display means for displaying the 2D representation on the image plane such that the modified viewing volume is provided for each eye of the operator.

16. The visual presentation system of claim 15, wherein the head position determining means includes a face tracking system.

17. The visual presentation system of claim 15, wherein the head position determining means includes a sensor for detecting one or more corresponding signal emitters located on the head of the operator.

18. The visual presentation system of claim 15, wherein the fixed viewing region corresponds to a window of the replica environment.

19. The visual presentation system of claim 15, wherein the fixed viewing region corresponds to a mirror of the replica environment.

20. The visual presentation system of claim 15, wherein the display means directly displays the 2D representation on the image plane.

21. The visual presentation system of claim 15, wherein the display means projects the 2D representation onto the image plane.

22. The visual presentation system of claim 15, wherein the display means is updated in real time based on the head position of the operator.

23. The visual presentation system of claim 15, wherein the data processor further includes in the generation of the 2D representation the application of windscreen effects to the 2D representation displayed on the image plane.

24. The visual presentation system of claim 15, further comprising head orientation determining means.

25. A 3D visual presentation system for a simulator, the simulator including a replica environment that includes a fixed viewing region corresponding to a view observed by an operator of the simulator, the system comprising:
- eye position determining means for determining the position of each eye of the operator of the replica environment;
- data processing means for modifying a viewing volume of a 3D world for each eye based on the eye position for each eye of the operator while keeping the image plane constant of the viewing volume that corresponds to the fixed viewing region for each eye and for generating separate 2D representations based on the modified viewing volume for each eye;
- display means for displaying the separate 2D representations on the image plane to form a stereo 2D representation; and
- viewing means for the operator to allow each eye of the operator to view the separate 2D representations.

* * * * *